June 25, 1963  D. A. HIRST  3,094,907
TAKE-OFF AND LANDING STRIP
Filed April 22, 1960

DONALD A. HIRST
INVENTOR.

BY *Albert S. Perry*

ATTORNEY

United States Patent Office 3,094,907
Patented June 25, 1963

3,094,907
TAKE-OFF AND LANDING STRIP
Donald Arthur Hirst, R.D. 1, Lambertville, N.J.
Filed Apr. 22, 1960, Ser. No. 23,973
4 Claims. (Cl. 94—4)

This invention relates to surfaces for use on landing fields, aircraft carriers and elsewhere to aid in the landing and take-off of aircraft.

The high speeds at which modern aircraft travel on landing has rendered it necessary to use landing strips of greater length and to employ braking means of increased effectiveness. Even then the hazards are great and damage to the tires on the landing wheels is so severe that they must be replaced frequently.

In accordance with the present invention, a surface is provided for the landing strip or area upon which the aircraft descends which is variable to retard the aircraft on landing while assuring a firm runway for take-off purposes. These advantages are attained by employing means which may be rendered relatively soft and yieldable or substantially rigid depending upon the needs at any particular time.

In the preferred form of the invention hereinafter described, the variation in the characteristics of the surface is effected by employing supporting members which are selectively clamped or pressed together or are permitted to move relative to one another depending upon whether the surface is to be maintained substantially rigid for take-off or is to be yieldable to retard a plane on landing.

Accordingly, the principal object of the invention is to provide a surface for a landing field, aircraft carrier or the like which is variable to present either a relatively stiff surface or a yieldable surface as desired.

A specific object of the invention is to provide a landing surface for aircraft embodying members which may be held in fixed relative positions or may be movable with respect to one another depending upon the condition of the surface desired.

These and other objects and features of the present invention will appear from the following description thereof wherein reference is made to the figures of the accompanying drawings.

Figure 1:
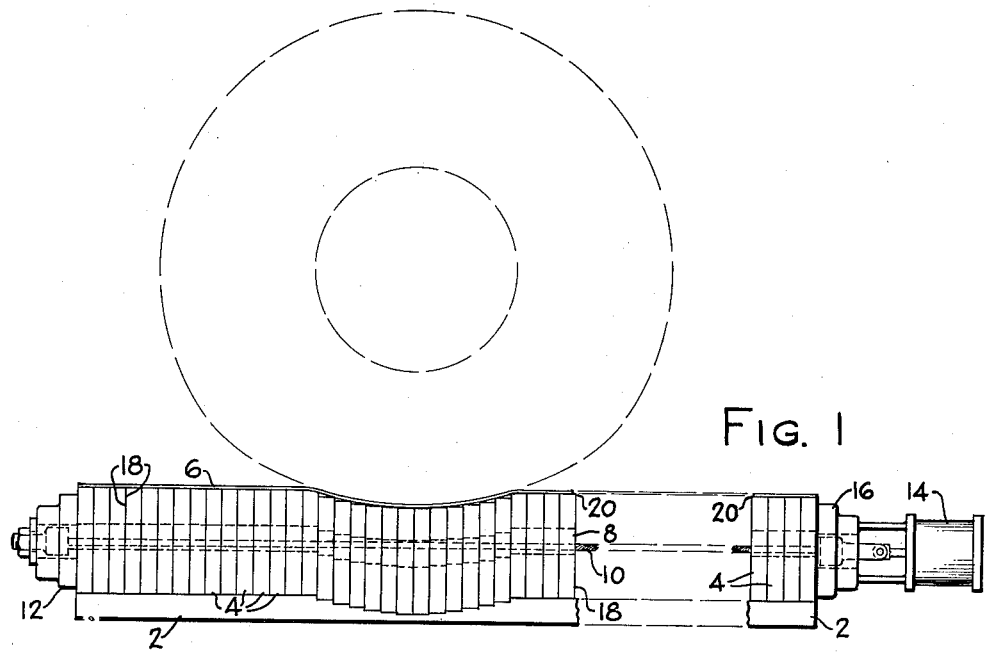
FIG. 1 is a diagrammatic longitudinal sectional view of one form of surface embodying the present invention.

In that form of the invention shown in the drawings, the runway surface is provided with a yieldable base 2 upon which are placed rigid blocks or strips of material 4 that are covered by a sheet of material 6. The base 2 is formed of compressible material such as rubber, neoprene, sponge material, or air cells which is yieldable under the weight of an aircraft or upon impact of the wheels when the aircraft is landing. The blocks of material 4 may therefore be displaced downwardly as shown in FIG. 1 to provide a yieldable but durable surface which will cushion the landing of the aircraft and impose a drag or retarding effect upon the aircraft as it moves over the surface of the blocks. The sheet of material 6 is preferably employed and serves as a cover for the blocks 4 preventing dirt and moisture from entering the spaces between the blocks 4.

The blocks 4 may be in the form of strips of wood, metal or other stiff or rigid material and extend transversely of the runway or landing surface. The blocks or strips are provided with pairs of openings 8 which are preferably spaced apart and located on opposite sides of the center line of the landing strip. Cables 10 extend through the openings 8 in the blocks and are secured at one end to a pressure strip 12. The opposite ends of the cables 10 are connected to tensioning means 14 which may be in the form of hydraulic cylinders or the like. An anchoring means 16 is located adjacent the block 4 nearest the tensioning means so as to prevent the blocks from being displaced longitudinally of the landing strip when tension is applied to the cables 10.

The tensioning members are operable at will to pull the cables taut so as to force the pressure strip 12 against the end block 4 in the assembly and thus clamp all of the blocks together between the pressure strip 12 and the anchoring means 16.

The blocks 4 are provided with adjacent faces 18 which are preferably flat or complementary so that when clamped together by the action of the cables 10, they cooperate to provide a stiff or rigid and substantially flat surface capable of supporting the aircraft during take-off. The upper surfaces or edges 20 of the blocks 4 are preferably flat and the cover sheet 6 is supported thereby and serves to present a smooth runway for take-off. However, the blocks are uniformly supported by the base layer 2 so that the clamped blocks bear against the whole area of the base sheet affording a solid support for the runway surface.

The blocks nevertheless are capable of being individually depressed when the cables 10 are released so as to provide a yieldable runway for landing purposes which will tend to retard the plane without causing excessive damage to the tires or requiring undue braking action on the wheels of the landing gear.

Figure 3:
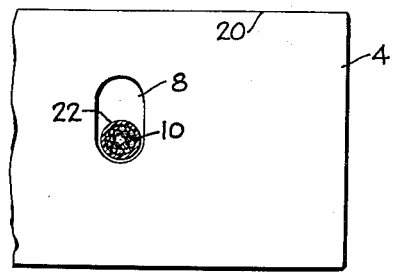
FIG. 3 is a front view of one of the blocks embodied in the construction of FIGS. 1 and 2.

The openings 8 in the blocks 4 through which the cables 10 extend are preferably elongated vertically as shown in FIG. 3. Moreover, the cable may be provided with a neoprene or other protective covering 22 whereby the cable can be tensioned and slackened as required without damaging the cable or the blocks themselves.

Figure 2:
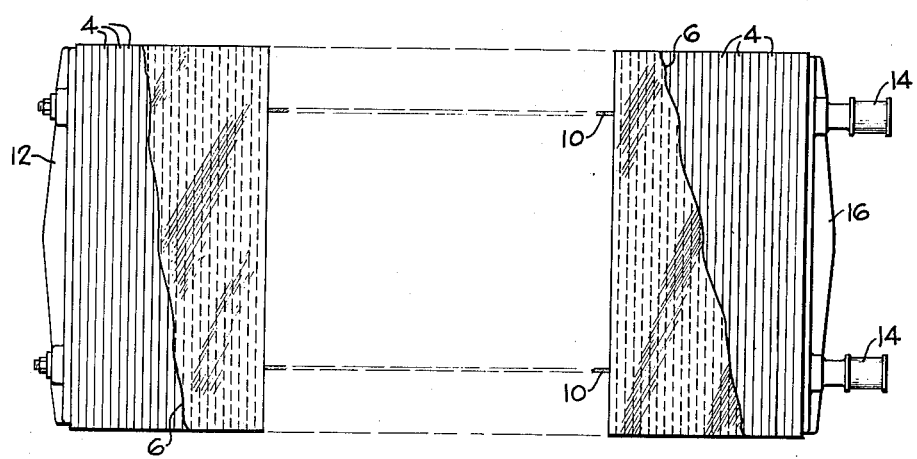
FIG. 2 is a top plan view of the construction shown in FIG. 1.

While the construction of FIG. 2 shows the assembly as being provided with two spaced cables for clamping the blocks 4 together, a single cable or three or more cables may be employed as desired. It will also be apparent that various forms and types of cable tensioning means may be employed for clamping the blocks of the runway surface together. Moreover, the blocks themselves may be of various length, form, size and shape for providing a runway surface of variable characteristics in accordance with the present invention.

In view thereof, it should be understood that the particular embodiment of the invention shown in the drawing and described above is intended to be illustrative only and is not intended to limit the scope of the invention.

I claim:

1. A surface for the landing and take-off of aircraft comprising a yieldable base structure, a group of blocks formed of substantially rigid material extending transversely of said surface and supported on said base structure, said blocks having adjacent faces which are substantially flat and vertical and having upper edges which cooperate to present a substantially flat runway surface, a cover sheet extending over the surface formed by said blocks, a pressure member positioned adjacent one end of said group of blocks, anchor means located adjacent the other end of said group of blocks, cables extending through openings in said blocks and attached to the pressure member, and hydraulic means located adjacent said anchor means and operable to place said cables under tension to clamp the blocks together and present a rigid surface for the take-off of aircraft, said hydraulic means being operable to release said cables and said blocks being individually movable to provide a yieldable surface for the landing of aircraft.

2. A surface for the landing and take-off of aircraft comprising a plurality of relatively movable members presenting upper surfaces cooperating to form a runway surface which is substantially greater in length than width, yieldable means located beneath said members and serving to support the same, a pressure member engaging a relatively movable member adjacent one end of said runway surface, an anchor member engaging a relatively movable member adjacent the opposite end of said runway surface, flexible cables extending lengthwise of the runway and connected to said pressure member, said cables being movable longitudinally and with respect to said anchor member, and fluid-operated means located adjacent said anchor member and connected to said cables, said fluid-operated means being positioned and available at all times to vary the tension applied to said cables, said pressure member being movable toward and away from said anchor member upon operation of said fluid-operated means to clamp the relatively movable members together to present a relatively rigid runway surface and to permit movement and separation of said relatively movable members to present a relatively yieldable runway surface.

3. A surface as defined in claim 2 wherein the yieldable means by which said relatively movable members are supported comprises an elastic layer of material.

4. A surface as defined in claim 2 wherein there is a layer of flexible covering material located above and in contact with said relatively movable members.

References Cited in the file of this patent

UNITED STATES PATENTS

| | | |
|---|---|---|
| 412,261 | Jerome | Oct. 8, 1889 |
| 1,661,407 | Butler | Mar. 6, 1928 |
| 1,739,193 | Ward | Dec. 10, 1929 |
| 2,000,977 | Moseley | May 14, 1935 |
| 2,125,785 | Hill | Aug. 2, 1938 |
| 2,686,344 | Van De Veer | Aug. 17, 1954 |
| 3,022,713 | Friberg | Feb. 27, 1962 |

FOREIGN PATENTS

| | | |
|---|---|---|
| 741,920 | Great Britain | Dec. 14, 1955 |
| 742,240 | Great Britain | Dec. 21, 1955 |